(12) United States Patent
Gipson et al.

(10) Patent No.: US 10,788,615 B2
(45) Date of Patent: Sep. 29, 2020

(54) LIGHT GUIDE WITH PREFORMED REFLECTOR PANEL

(71) Applicant: Dura Operating, LLC, Auburn Hills, MI (US)

(72) Inventors: Ron Gipson, Metamora, MI (US); Bhanumurthy Veeragandham, Auburn Hills, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 217 days.

(21) Appl. No.: 16/109,186

(22) Filed: Aug. 22, 2018

(65) Prior Publication Data

US 2020/0064537 A1 Feb. 27, 2020

(51) Int. Cl.
*F21V 8/00* (2006.01)

(52) U.S. Cl.
CPC ......... *G02B 6/0055* (2013.01); *G02B 6/0021* (2013.01); *G02B 6/0065* (2013.01); *G02B 6/0083* (2013.01)

(58) Field of Classification Search
CPC .. G02B 6/0055; G02B 6/0021; G02B 6/0065; G02B 6/0083; G02B 6/0088; G02B 6/0068; G02B 6/0051; G02B 6/0073; G02B 1/00; F21Y 2101/00; F21V 7/00; F21V 19/001; F21K 9/00; F21L 2001/00; B60Q 1/2696; H05K 1/0298; H05K 1/142; H05K 3/284

USPC .................................................. 362/600–634
See application file for complete search history.

(56) References Cited

U.S. PATENT DOCUMENTS

| | | | |
|---|---|---|---|
| 5,947,578 A | 9/1999 | Ayres | |
| 7,621,654 B2* | 11/2009 | Nishimoto | H01L 24/97 |
| | | | 257/98 |
| 9,869,810 B2 | 1/2018 | Keranen et al. | |
| 2016/0358896 A1* | 12/2016 | Jeon | H01L 25/0753 |
| 2017/0082790 A1* | 3/2017 | Cho | G02B 6/003 |

* cited by examiner

*Primary Examiner* — Cara E Rakowski
*Assistant Examiner* — Jessica M Apenteng
(74) *Attorney, Agent, or Firm* — Vivacqua Crane PLLC

(57) ABSTRACT

A molded component assembly includes a printed circuit board with a first face and an oppositely facing second face. Multiple light emitting diodes are mounted on a first portion of the first face. Multiple electronics components are mounted on a second portion of the first face. A light guide of a light translucent polymeric material has a contact surface directly contacting the first portion of the first face and multiple light outlets defining cavities in the light guide. The light guide is seated over the light emitting diodes and directly receives visible light from the light emitting diodes and transmits the visible light to the light outlets. A reflector plate directly contacts the light guide and extends over the second portion including the electronics components, and includes filler members extending into the light guide. The reflector plate reflects visible light back into the light guide.

20 Claims, 5 Drawing Sheets

LIGHT GUIDE WITH PREFORMED REFLECTOR PANEL

FIELD

The present disclosure relates generally to printed circuit boards having at least one light generating component and a light guide.

BACKGROUND

The statements in this section merely provide background information related to the present disclosure and may or may not constitute prior art.

Electronic assemblies with backlit visual elements may be manufactured via several processes. Most commonly, a plastic part of a polymeric material resin is molded with some portion of the plastic being clear or translucent, with electronics components including one or more light sources attached mechanically to the part after molding, so that light is visible through the clear or translucent portion, resulting in a backlighting effect. More recently, methods have been developed of embedding one or more light sources in a molded plastic part. One such method is to encapsulate light sources and associated electronics components (collectively "package") in a clear resin via low-pressure molding and then to injection-mold plastic over or around the encapsulated package. The encapsulated package is thereby embedded in the plastic, with some portion of the plastic being clear or translucent so that light from the encapsulated package is visible through the clear or translucent plastic, resulting in a backlighting effect.

Another such method is to mount light sources and associated electronics ("package") onto a polymer film, form the film into a desired shape, and then insert the formed film into an injection mold having substantially the same shape. A following step injection-molds plastic onto the film such that the package is embedded between the film on which it is mounted and the plastic that has been molded onto it, with portions of the film and/or plastic being clear or translucent such that light from the light sources is visible from the part exterior, resulting in a backlighting effect.

Electronics components may also be printed onto a film. The film is then inserted into an injection mold, where plastic is molded onto the film, the electronics components being embedded in the molded plastic so that when the plastic part is removed from the mold the film is peeled away from the plastic part, leaving the electronics components embedded in or adhered to the surface of the plastic part.

Thus, while current printed film assemblies achieve their intended purpose, there is a need for a new and improved system and method for preparing light guides used for film assemblies having light emitting diodes.

SUMMARY

According to several aspects, a molded component assembly includes a printed circuit board with a first face and an oppositely facing second face. Multiple light emitting diodes are mounted on a first portion of the first face. A light guide of a light translucent polymeric material includes: a contact surface; an outer surface oppositely facing with respect to the contact surface; and multiple light outlets; wherein the contact surface contacts the first portion of the first face having the light guide seated over the light emitting diodes and directly receives visible light from the light emitting diodes and transmits the visible light to the light outlets. A reflector plate is disposed over and directly contacts the outer surface of the light guide. The reflector plate includes multiple filler members extending into the light guide. The reflector plate reflects visible light transmitted toward the outer surface of the light guide back into the light guide.

In another aspect of the present disclosure, the reflector plate is a white color.

In another aspect of the present disclosure, the reflector plate has a partial cavity corresponding in shape to and receiving the light guide when the reflector plate directly contacts the outer surface of the light guide.

In another aspect of the present disclosure, the light outlets of the light guide each define a generally U-shaped cavity. The multiple filler members each extend away from a lower surface of the reflector plate and are each sized to fit into one of the light outlets, with each of the filler members extending into one of the light outlets when the reflector plate directly contacts the outer surface of the light guide.

In another aspect of the present disclosure, the light guide includes multiple male projections; and the reflector plate includes multiple apertures each frictionally receiving one of the male projections of the light guide to retain the reflector plate in contact with the light guide.

In another aspect of the present disclosure, the light guide includes multiple light lenses each having multiple beveled surfaces that are non-orthogonal with the contact surface to reflect the visible light to the light outlets.

In another aspect of the present disclosure, a portion of the reflector plate directly contacts a planar reflector surface of each of the light lenses.

In another aspect of the present disclosure, the printed circuit board includes multiple through apertures extending from the first face toward the second face; and each of the light lenses includes a male extension portion extending over one of the through apertures in the printed circuit board, wherein light emitted by the light emitting diodes and received in the light guide is outlet through the male extension portion of each of the light lenses via the through apertures.

In another aspect of the present disclosure, each male extension portion of each of the light lenses includes a distal end positioned flush with the second face of the printed circuit board.

In another aspect of the present disclosure, each male extension portion of each of the light lenses includes a distal end spaced apart from the second surface of the printed circuit board.

In another aspect of the present disclosure, multiple electronics components are disposed on a second portion of the first face of the printed circuit board, and a layer of a polymeric material is overmolded over the electronics in the second portion of the printed circuit board.

In another aspect of the present disclosure, the light guide and the layer are integrally formed.

In another aspect of the present disclosure, multiple light emitting diode receiving pockets define recesses in the contact surface, each sized to receive one of the light emitting diodes when the contact surface directly contacts the first portion of the first face.

In another aspect of the present disclosure, the light emitting diodes define side firing diodes, with visible light emitted from the light emitting diodes directed generally parallel to the first surface.

According to several aspects, a molded component assembly includes a printed circuit board with a first face and an oppositely facing second face. Multiple light emitting diodes are mounted on a first portion of the first face. Multiple electronics components are mounted on a second portion of the first face. A light guide of a light translucent polymeric material has a contact surface directly contacting the first portion of the first face and multiple light outlets defining cavities in the light guide. The light guide is seated over the light emitting diodes and directly receives visible light from the light emitting diodes and transmitting the visible light to the light outlets. A reflector plate directly contacts the light guide and extends over the second portion of the first face including the electronics components. The reflector plate reflects visible light transmitted to the reflector plate back into the light guide.

In another aspect of the present disclosure, the printed circuit board includes multiple through apertures individually positioned proximate to individual ones of the light emitting diodes.

In another aspect of the present disclosure, the reflector plate includes multiple filler members each extending away from a lower surface of the reflector plate and each sized to fit into one of the light outlets, each of the filler members substantially surrounding one of the through apertures except between opposed end faces of the filler members where light from the light emitting diodes enters.

In another aspect of the present disclosure, the light guide includes multiple light lenses co-molded of the polymeric material and homogeneously connected to the light guide, each extending into one of the light outlets and each extending at least partially into one of the through apertures.

In another aspect of the present disclosure, an outer surface of the light guide oppositely facing with respect to the contact surface, wherein the reflector plate directly contacts the outer surface of the light guide.

According to several aspects, a molded component assembly includes a printed circuit board with a first face and an oppositely facing second face. Multiple light emitting diodes are mounted on a first portion of the first face. Multiple electronics components are mounted on a second portion of the first face. A light guide of a light translucent polymeric material has a contact surface directly contacting the first portion of the first face and multiple light outlets defining cavities in the light guide. The light guide is seated over the light emitting diodes and directly receives visible light from the light emitting diodes and transmits the visible light to the light outlets. An outer surface of the light guide is oppositely facing with respect to the contact surface. A reflector plate is disposed over and directly contacts the outer surface of the light guide and extends over the second portion of the first face including the electronics components. The reflector plate includes multiple filler members each extending away from a lower surface of the reflector plate each sized to fit into one of the light outlets, with each of the filler members extending into one of the light outlets when the reflector plate directly contacts the outer surface of the light guide. The reflector plate reflects visible light transmitted to the outer surface of the light guide back into the light guide.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
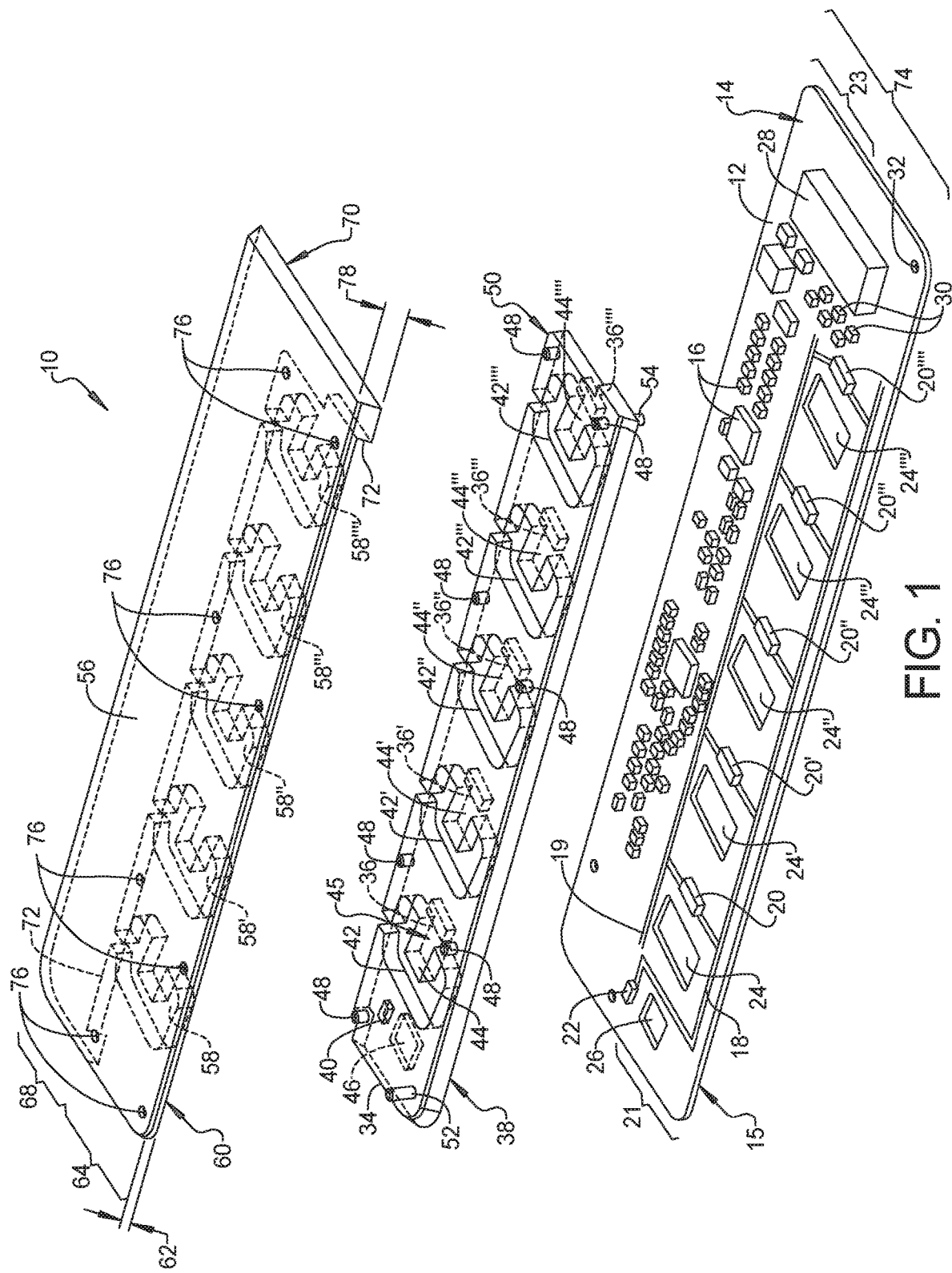
FIG. 1 is a front perspective assembly view of a laminated light guide and component carrier according to an exemplary embodiment.

Referring to FIG. 1, a laminated light guide and component carrier defining a molded component assembly 10 includes a molded body 12 such as a printed circuit board having multiple electrical components mounted thereon. According to several aspects, the molded body 12 defines a rectangular shape, however any desired geometric shape may be used. The molded body 12 includes a first side or first face 14 and an oppositely directed second face 15. On the first face 14 of the molded body 12 are located multiple electronics components 16 including capacitors, which are electrically connected to a plurality of first electrical traces 18, 19 (only partially shown for clarity) printed for example by a screen printing process onto the first face 14.

Multiple light emitting diodes 20, 20', 20", 20''', 20'''' are also individually mounted on a first portion 21 of the first face 14 and are connected to the electrical traces 18, 19. An additional light emitting diode 22 can optionally be provided at one end of the first portion 21 of the first face 14 of the molded body 12 to provide an illuminated indication that electrical power is available for the molded component assembly 10. According to several aspects, the multiple electronics components 16 are disposed on a second portion 23 of the first face 14 of the molded body 12. According to several aspects, the light emitting diodes 20, 20', 20", 20''', 20'''' define side firing diodes, with visible light emitted from the light emitting diodes directed generally parallel to the first face 14.

Positioned proximate to each of the light emitting diodes 20, 20' are multiple individual through apertures 24, 24', 24", 24''', 24'''' created in the molded body 12. According to several aspects each of the through apertures 24, 24', 24", 24''', 24'''' are square or rectangular shaped, however any geometry can be selected. A separate through aperture 26 may also be provided proximate to the light emitting diode 22, which is similar to the through apertures 24, 24', 24", 24''', 24'''' in function, but may have a smaller cross section. Also positioned on the first face 14 of the molded body 12 is a connector 28 which is connected to the electrical traces 18, 19. Multiple capacitive touch film contacts 30 are provided proximate to a space envelope of the connector 28. Multiple through apertures 32 are provided through the molded body 12 which frictionally receive pins discussed below.

A light guide 34 is molded from a single injection molding shot of an optically clear polymeric material such as polymethyl methacrylate (PMMA) which is transparent or translucent to allow light passage through the light guide 34. Multiple light emitting diode receiving pockets 36, 36', 36", 36''', 36'''' are formed that open from a contact surface 38 defining a molded body facing side of the light guide 34. Each of the pockets 36, 36', 36'', 36''', 36'''' is sized to receive and partially surround one of the light emitting diodes 20, 20', 20'', 20''', 20'''' when the light guide 34 is press-fit onto the first face 14 of the molded body 12. A separate pocket 40 is also created in the light guide 34 which receives the light emitting diode 22.

Multiple generally U-shaped cavities defining light outlets 42, 42', 42'', 42''', 42'''' are created through the light guide 34 each aligned with individual ones of the through apertures 24, 24', 24'', 24''', 24'''' when the light guide 34 is press-fit onto the first face 14 of the molded body 12. Multiple light reflectors or light lenses 44, 44', 44'', 44''', 44'''', co-molded of the PMMA material and homogeneously connected to the light guide 34 each extend into one of the light outlets 42. Each of the light lenses 44, 44', 44'', 44''', 44'''' includes a planar reflector surface 45 oriented substantially parallel to the contact surface 38. When the light guide 34 is positioned on the molded body 12 each of the light lenses 44, 44', 44'', 44''', 44'''' substantially overlaps one of the through apertures 24, 24', 24'', 24''', 24'''' with the light guide 34 press-fit onto pins described below extending from the first face 14 of the molded body 12. A separate light lens 46 also co-molded of the PMMA material and homogeneously connected to the light guide 34 overlaps the through aperture 26 when the light guide 34 is positioned on the molded body 12.

Multiple male projections defining first pins 48 co-molded of the PMMA material and homogeneously connected to the light guide 34 extend upwardly as viewed in FIG. 1 away from an outer surface 50 of the light guide 34. A separate male projection defining an alignment pin 52 which is longer than the first pins 48 can also be provided. In addition to the first pins 48 extending from the outer surface 50, multiple male projections defining second pins 54, only one of which is partially visible in this view, extend downwardly away from the contact surface 38. Each of the second pins 54 is frictionally received in one of the through apertures 32 formed in the molded body 12 when the light guide 34 is press-fit onto the first face 14 of the molded body 12.

A reflector plate 56 of a polymeric material such as an injected resin or a stamped film is molded using a molding process. The reflector plate 56 is positioned in direct contact with the outer surface 50 of the light guide 34 and covers the electronics components 16, and directly contacts a portion of the first face 14 of the molded body 12. According to several aspects, the reflector plate 56 is white in color to reflect visible light created when the light emitting diodes 20, 20', 20'', 20''', 20'''', 22 are energized which would otherwise escape through the light guide 34 and return the light back into the light guide 34. When the light guide 34 is positioned on the molded body 12 a portion of the reflector plate 56 also directly contacts the planar reflector surface 45 of each of the light lenses 44, 44', 44'', 44''', 44''''. Multiple filler members 58 are co-molded with and homogeneously extend from a lower surface 60 of the reflector plate 56. Each of the filler members 58 is sized to be slidably received in and to substantially fill one of the cavities defining the light outlets 42 extending through the light guide 34 when the lower surface 60 is brought into direct contact with the outer surface 50 of the light guide 34. The light outlets 42 created in the light guide 34 receive the filler members 58 which extend from the reflector plate 56 to add white reflective material of the reflector plate 56 directly into the light guide 34.

A first thickness 62 of the reflector plate 56 in in a first section 64 of the filler members 58 is less than a second thickness 66 defining a second section 68 of the reflector plate 56. A contact surface 70 is created in the second section 68 having the second thickness 66, and a partial cavity 72 is provided in the first section 64 having the filler members 58. The contact surface 70 directly contacts an area 74 of the first face 14 of the molded body 12 when the reflector plate 56 is brought into direct contact with each of the light guide 34 and the molded body 12, with the light guide 34 positioned within the partial cavity 72. Each of the first pins 48 of the light guide 34 are frictionally received in one of multiple through apertures 76 created in the reflector plate 56 to fix the reflector plate 56 onto the light guide 34. A full thickness body portion 78 of the reflector plate 56 is created outside of the partial cavity 72, which provides the contact surface 70.

Referring to FIG. 2 and again to FIG. 1, a completed assembly of the molded component assembly 10 provides the light guide 34 frictionally coupled to the molded body 12 using the second pins 54, and the reflector plate 56 overlayed onto and frictionally coupled to both the light guide 34 and the molded body 12 using the first pins 48 and the alignment pin 52. In the assembled condition, each of the light emitting diodes such as the light emitting diode 20 is received in one of the pockets such as the pocket 36. Light generated by each light emitting diode as visible light is directed primarily toward the light lens of its associated light guide, such as from the light emitting diode 20 toward the light lens 44, in the direction of a light arrow 80. Each light guide disperses light out via one of the through apertures 24, 24', 24'', 24''', 24'''', for example light from the light emitting diode 20 is dispersed through the light lens 44 out via the through aperture 24. The openings provided in the light guide 34 via the light outlets 42 surrounding the light guides help limit light dispersion through only one of the through apertures via only one of the light guides, such as through the through aperture 24 via the light lens 44.

Light rays as visible light emitted from the light emitting diodes 20, 20', 20'', 20''', 20'''' reflect off multiple beveled surfaces 82, 84, 86 of each of the light lenses 44, which direct the light rays out the through apertures 24, 24', 24'', 24''', 24''''. Light rays emitted by the light emitting diode 22 are directed out the through aperture 26. The light rays as visible light pass through graphics (not shown) created on a finish layer of an acrylonitrile butadiene styrene (ABS) plastic (not shown) of the molded component assembly 10. The angles of the beveled surfaces 82, 84, 86 are each oriented approximately 45 degrees with respect to the contact surface 38 which is oriented parallel to the outer surface 50 of the light guide 34. The beveled surfaces 82, 84, 86 reflect and direct the light to intensify the light toward a center of each of the light lenses 44. Visible light emitted by the light emitting diodes 20, 20', 20'', 20''', 20'''', 22 also reflects off the white reflector plate 56 back toward the light guide 34 and the molded body 12, and is thereby available to be reflected off the multiple beveled surfaces 82, 84, 86 and out the through apertures 24, 24', 24'', 24''', 24''''.

Figure 2:
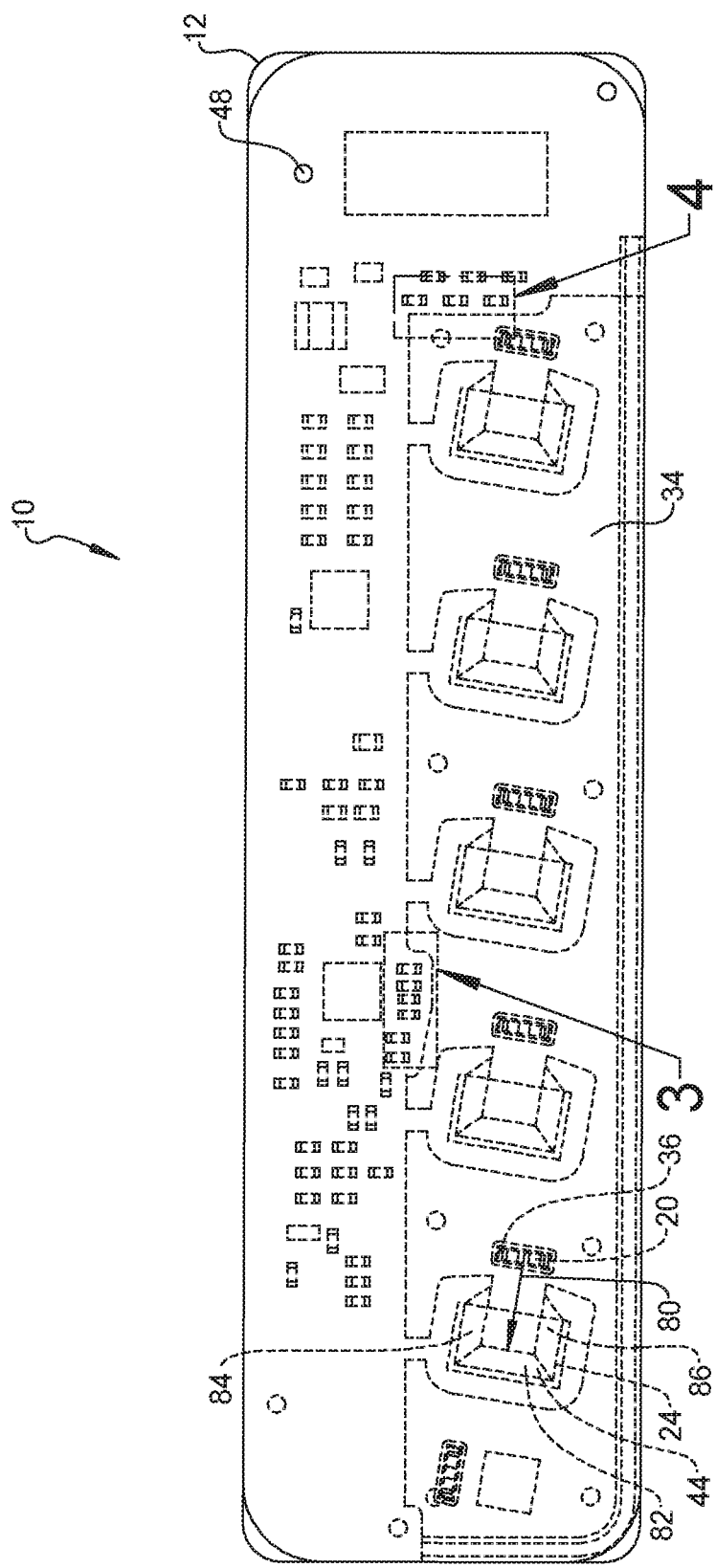
FIG. 2 is a top plan view of an assembled laminated light guide and component carrier of FIG. 1.

Referring to FIG. 3 and again to FIGS. 1 through 2, the second portion 23 of the body 12 having the electronics components 16 mounted thereon is generally not covered by the light guide 34. To encapsulate and environmentally protect the electronics components 16, a first polymeric material 88 is molded over the second portion 23 of the first face 14 encapsulating the electronics components 16 and contacting a portion 90 of the light guide 34. According to several aspects, a second polymeric material 92 is overmolded over the light guide 34 and at least partially over the first material 88.

Figure 3:
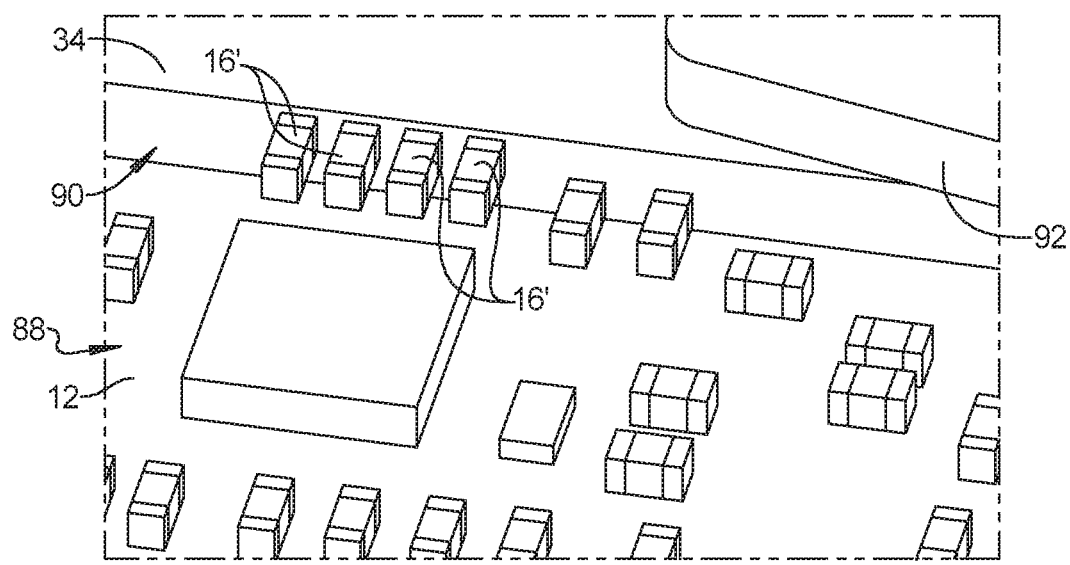
FIG. 3 is a rear perspective view of area 3 of FIG. 2.
Figure 4:
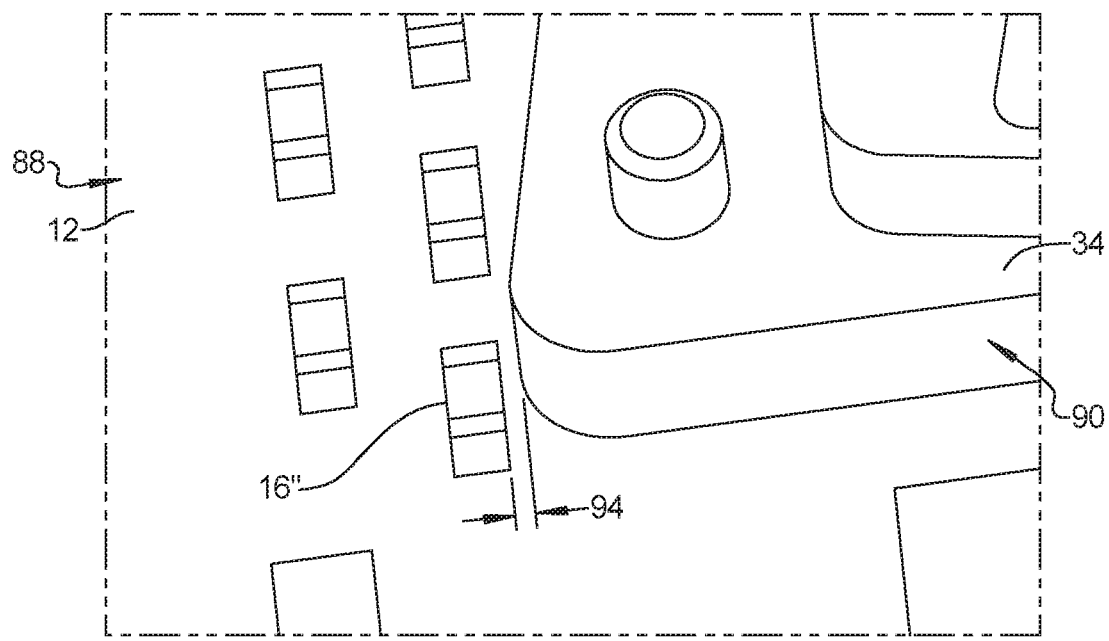
FIG. 4 is an end perspective view of area 4 of FIG. 2.

Referring to FIG. 4 and again to FIGS. 1 through 3, to the maximum extent possible, a minimum clearance 94 is maintained between the edge 90 of the light guide 34 in its installed position on the molded body 12 and any of the electronics components 16 such as an exemplary electronic component 16". According to several aspects, the minimum clearance 94 is approximately 0.2 mm which provides for tolerance stack-up and thermal expansion between components.

Figure 5:
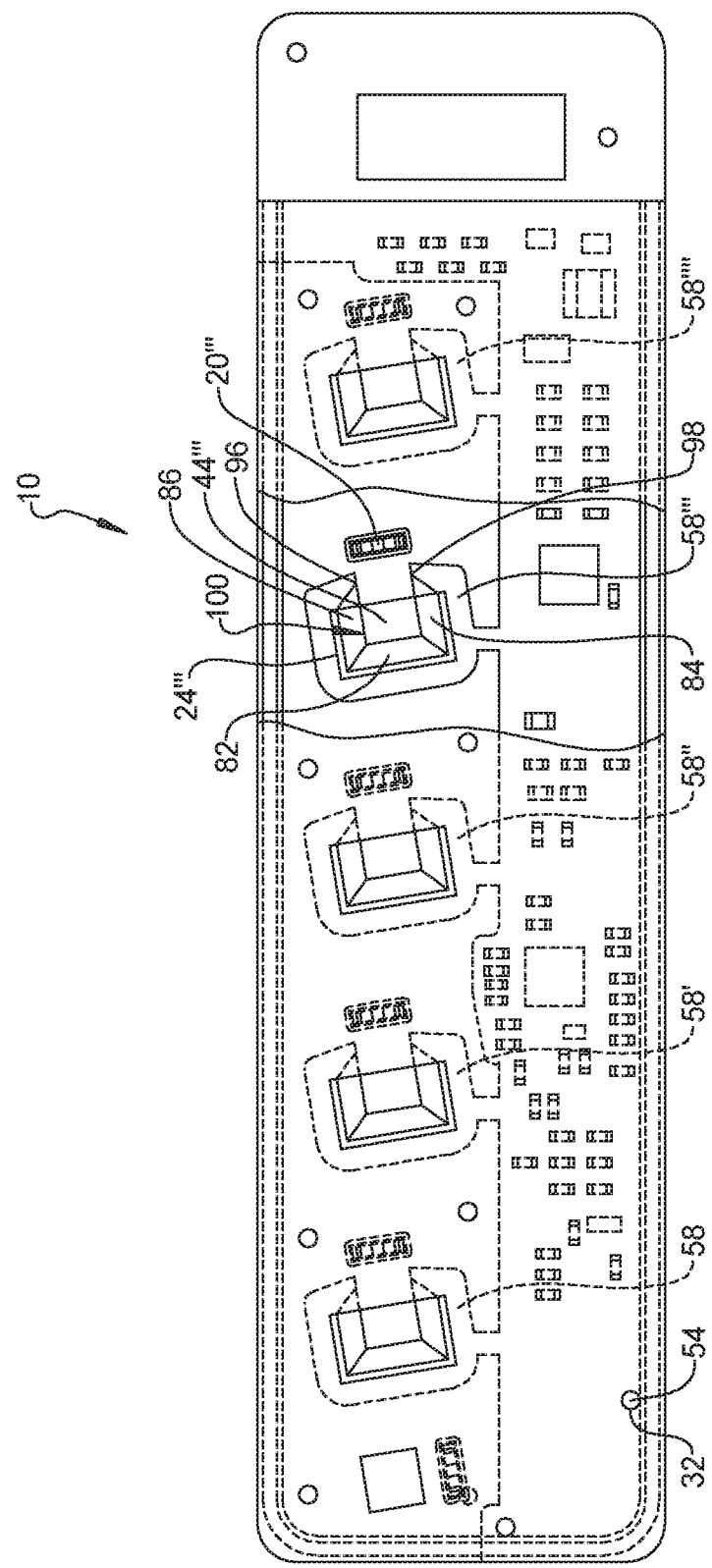
FIG. 5 is a bottom plan view of the laminated light guide and component carrier of FIG. 1.

Referring to FIG. 5 and again to FIGS. 1 through 4, each of the multiple filler members 58, 58', 58", 58'", 58"" are shown in the installed positions. A partial thickness of the molded body 12 has been removed for clarity, presenting the filler member 58'", and the light lens 44'" more clearly. The following discussion of the filler member 58'" and the light lens 44'" therefore applies equally to all of the filler members and light lenses. The filler member 58'" substantially surrounds the through aperture 24'" except between opposed end faces 96, 98 where light from the light emitting diode 20'" enters the light lens 44'". A distal end 100 of the light lens 44'" defines a substantially flat face having a geometry that substantially matches a geometry of the through aperture 24'", and thereby covers the through aperture 24'" to create a light outlet. According to several aspects, the distal end 100 is positioned flush with the second face 15 of the molded body 12. According to further aspects, the distal end 100 is positioned at least partially within the through aperture 24'" but is spaced apart from the second face 15 of the molded body 12. Light generated by the light emitting diode 20'" enters the light lens 44'", reflects off each of the beveled surfaces 82, 84, 86, and is dispersed from the distal end 100 defining the light outlet from the through aperture 24'" in a direction toward the viewer as shown in FIG. 5.

Referring to FIG. 6 and again to FIG. 1, the reflector plate 56 is shown in position prior to assembly onto the light guide 34. To install the reflector plate 56 each of the filler members 58, 58', 58", 58'", 58"" such as the filler member 58'" is aligned with one of the light outlets 42, 42', 42", 42'", 42"" such as the light outlet 42"" and the reflector plate 56 is pressed onto the light guide 34 in a direction 102 until each of the filler members 58, 58', 58", 58'", 58"" are slidably received in one of the light outlets 42, 42', 42", 42'", 42"". At the same time, individual ones of the pins 48, 52 are frictionally received in individual ones of the apertures 76 to frictionally lock the reflector plate 56 onto the light guide 34. As the lower surface 60 of the reflector plate 56 directly contacts the outer surface 50 of the light guide 34 each of the planar reflector surfaces 45 of the light lenses 44, 44', 44", 44'", 44"" also directly contacts the lower surface 60.

Figure 6:
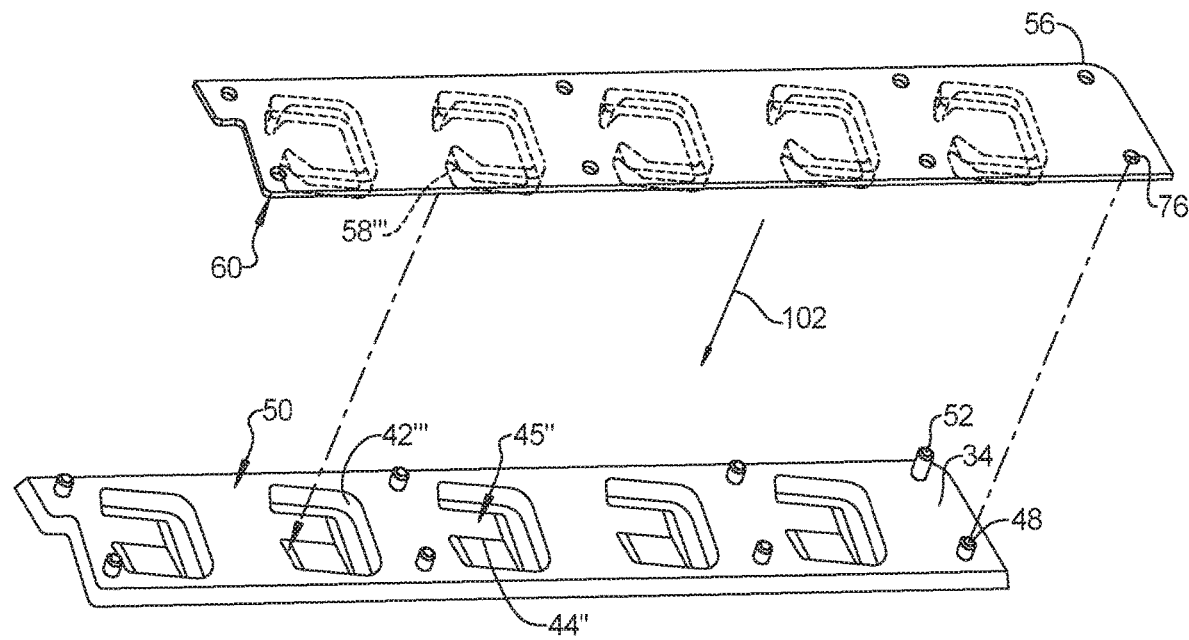
FIG. 6 is a side perspective assembly view of the reflector plate and the light guide of FIG. 1 prior to assembly.
Figure 7:
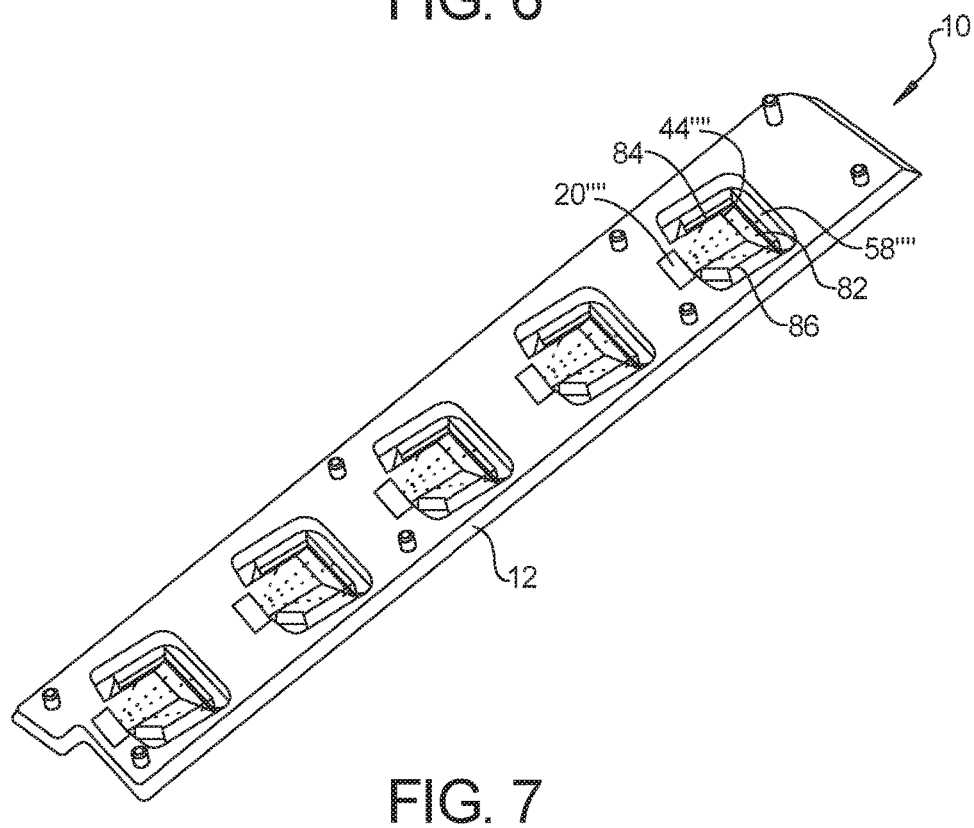
FIG. 7 is a top perspective view of the assembled reflector plate and light guide of FIG. 6.

Referring to FIG. 7 and again to FIGS. 1 and 6, a completed assembly of the reflector plate 56, the light guide 34, and the molded body 12 which together defines the molded component assembly 10 positions the side firing light emitting diodes 20, 20', 20", 20'", 20"" such as the light emitting diode 20"" to emit light rays which are reflected off the individual beveled surfaces 82, 84, 86 of each of the light lenses 44 such as the light lens 44"", and are reflected off of the filler members 58, 58', 58", 58'", 58"" such as the filler member 58"" to exit downwardly as viewed in FIG. 7 out of the through apertures 24, 24', 24", 24'", 24"" shown and described in reference to FIG. 1. Light rays which travel upwardly as viewed in FIG. 7 are reflected off the white reflector plate 56 and back down toward the through apertures. By separating each of the filler members 58, 58', 58", 58'", 58"" into one of their own assigned light outlet 42, 42', 42", 42'", 42"" light from individual light emitting diodes is segmented and therefore predominantly emitted only from one of the through apertures 24, 24', 24", 24'", 24"". Individual ones of the light emitting diodes 20, 20', 20", 20'", 20"" can therefore be energized and their light rays segmented.

A molded or laminated light guide and component carrier defining a molded component assembly 10 of the present disclosure offers several advantages. These include provision of a white reflector plate directly onto a light transmissive light guide which reflects light off the white reflector plate back into the light guide. Cavities created in the light guide receive filler portions extending from the reflector plate to add reflective material of the reflector plate directly into the light guide. Light lenses of the light guide also extend into the cavities to maximize the reflection of light emitted from light emitting diodes positioned proximate to the light lenses.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A molded component assembly, comprising:
a printed circuit board with a first face and an oppositely facing second face;
a light emitting diode mounted on a first portion of the first face;
a light guide of a light translucent polymeric material having: a contact surface; an outer surface oppositely facing with respect to the contact surface; and a light outlet; wherein the contact surface contacts the first portion of the first face having the light guide seated over the light emitting diode and directly receiving visible light from the light emitting diode and transmitting the visible light to the light outlet; and
a reflector plate disposed over and directly contacting the outer surface of the light guide, the reflector plate including a filler member extending into the light guide, the reflector plate reflecting visible light transmitted toward the outer surface of the light guide back into the light guide.

2. The molded component assembly of claim 1, wherein the reflector plate is a white color.

3. The molded component assembly of claim 1, wherein the reflector plate has a partial cavity corresponding in shape to and receiving the light guide when the reflector plate directly contacts the outer surface of the light guide.

4. The molded component assembly of claim 1, wherein:
the light outlet of the light guide defines a generally U-shaped cavity; and
the filler member extends away from a lower surface of the reflector plate and is sized to slidably fit into the light outlet, with the filler member extending into the light outlet when the reflector plate directly contacts the outer surface of the light guide.

5. The molded component assembly of claim 1, wherein:
the light guide includes a male projection; and
the reflector plate includes an aperture frictionally receiving the male projection of the light guide to retain the reflector plate in contact with the light guide.

6. The molded component assembly of claim 1, wherein the light guide includes a light lens having beveled surfaces that are non-orthogonal with the contact surface to reflect the visible light to the light outlet.

7. The molded component assembly of claim 6, wherein a portion of the reflector plate directly contacts a planar reflector surface of the light lens.

8. The molded component assembly of claim 6, wherein:
the printed circuit board includes a through aperture extending from the first face toward the second face; and
the light lens includes a male extension portion extending over the through aperture in the printed circuit board, wherein light emitted by the light emitting diode and received in the light guide is outlet through the male extension portion of the light lens via the through aperture.

9. The molded component assembly of claim 8, wherein the male extension portion of the light lens includes a distal end positioned flush with the second face of the printed circuit board.

10. The molded component assembly of claim 8, wherein each male extension portion of each of the light lenses includes a distal end spaced apart from the second surface of the printed circuit board.

11. The molded component assembly of claim 1, further comprising:
an electronics component disposed on a second portion of the first face of the printed circuit board, and
a layer of a polymeric material overmolded over the electronics component in the second portion of the printed circuit board.

12. The molded component assembly of claim 11, wherein the light guide and the layer are integrally formed.

13. The molded component assembly of claim 1, further comprising a light emitting diode receiving pocket defining a recess in the contact surface and sized to receive the light emitting diode when the contact surface directly contacts the first portion of the first face.

14. The molded component assembly of claim 1, wherein the light emitting diode defines a side firing diode, with visible light emitted from the light emitting diode directed generally parallel to the first surface.

15. A molded component assembly, comprising:
a printed circuit board with a first face and an oppositely facing second face;
multiple light emitting diodes mounted on a first portion of the first face;
multiple electronics components mounted on a second portion of the first face;
a light guide of a light translucent polymeric material having a contact surface directly contacting the first portion of the first face and multiple light outlets defining cavities in the light guide, the light guide seated over the light emitting diodes and directly receiving visible light from the light emitting diodes and transmitting the visible light to the light outlets; and a reflector plate directly contacting the light guide and extending over the second portion of the first face including the electronics components, the reflector plate including multiple filler members extending into the light guide, the reflector plate reflecting visible light transmitted to the reflector plate back into the light guide.

16. The molded component assembly of claim 15, wherein the printed circuit board includes multiple through apertures individually positioned proximate to individual ones of the light emitting diodes.

17. The molded component assembly of claim 16, wherein the multiple filler members each extend away from a lower surface of the reflector plate and are each sized to slidably fit into one of the light outlets, each of the filler members substantially surrounding one of the through apertures except between opposed end faces of the filler members where light from the light emitting diodes enters.

18. The molded component assembly of claim 17, wherein the light guide includes multiple light lenses co-molded of the polymeric material and homogeneously connected to the light guide, each extending into one of the light outlets and each extending at least partially into one of the through apertures.

19. The molded component assembly of claim 15, further including an outer surface of the light guide oppositely facing with respect to the contact surface, wherein the reflector plate directly contacts the outer surface of the light guide.

20. A molded component assembly, comprising:
a printed circuit board with a first face and an oppositely facing second face;
multiple light emitting diodes mounted on a first portion of the first face;
multiple electronics components mounted on a second portion of the first face;
a light guide of a light translucent polymeric material having a contact surface directly contacting the first portion of the first face and multiple light outlets defining cavities in the light guide, the light guide seated over the light emitting diodes and directly receiving visible light from the light emitting diodes and transmitting the visible light to the light outlets;
an outer surface of the light guide oppositely facing with respect to the contact surface; and
a reflector plate disposed over and directly contacting the outer surface of the light guide and extending over the second portion of the first face including the electronics components, the reflector plate including multiple filler members each extending away from a lower surface of the reflector plate each sized to fit into one of the light outlets, with each of the filler members extending into one of the light outlets when the reflector plate directly contacts the outer surface of the light guide the reflector plate reflecting visible light transmitted to the outer surface of the light guide back into the light guide.

* * * * *